United States Patent [19]

Naitoh et al.

[11] 4,398,258
[45] Aug. 9, 1983

[54] MALFUNCTION PROCEDURE INDICATING SYSTEM AND METHOD

[75] Inventors: Masataka Naitoh, Kariya; Susumu Urano, Oobu; Minoru Kuroda, Aichi; Yasuhumi Kojima, Gifu; Kenji Tsukahara, Oobu, all of Japan

[73] Assignee: Nippondenso Co., Ltd., Kariya, Japan

[21] Appl. No.: 218,832

[22] Filed: Dec. 22, 1980

[30] Foreign Application Priority Data

Dec. 26, 1979 [JP] Japan .................... 54-169971

[51] Int. Cl.³ ................... A62C 27/18; G06F 15/46
[52] U.S. Cl. ................... 364/551; 364/513; 364/424
[58] Field of Search ............ 364/551, 513, 424, 710, 364/185; 340/52 R, 517-518

[56] References Cited

U.S. PATENT DOCUMENTS

| 3,356,836 | 12/1967 | Stenby | 364/710 |
| 3,774,148 | 11/1973 | McIntosh | 340/52 R |
| 3,828,252 | 8/1974 | Wolff | 364/710 X |
| 3,906,437 | 9/1975 | Brandwein et al. | 364/424 X |
| 3,975,708 | 8/1976 | Lusk et al. | 340/52 R X |
| 3,978,659 | 9/1976 | Smith et al. | 364/185 X |
| 4,031,363 | 6/1977 | Freeman et al. | 364/424 |
| 4,041,470 | 8/1977 | Slane et al. | 340/52 R X |
| 4,107,646 | 8/1978 | Arai et al. | 340/517 X |
| 4,114,442 | 9/1978 | Pratt | 364/550 X |
| 4,189,005 | 2/1980 | McLoughlin | 169/24 |
| 4,234,926 | 11/1980 | Wallace et al. | 364/185 X |
| 4,245,312 | 1/1981 | deVulpillieres | 364/431 |
| 4,277,772 | 7/1981 | Kastura et al. | 340/52 R X |
| 4,282,404 | 8/1981 | Tanimoto et al. | 364/710 X |
| 4,290,109 | 9/1981 | Taniguchi et al. | 364/483 X |

Primary Examiner—Edward J. Wise
Attorney, Agent, or Firm—Cushman, Darby & Cushman

[57] ABSTRACT

A malfunction procedure indicating system which monitors continuously the condition of a plurality of inspection items associated with the operation of a vehicle, whereby when the existence of a malfunction in at least one of the plurality of inspection items is detected, a first procedure corresponding to the malfunction is indicated by both verbal representation and visual display during the operation of the vehicle and a second procedure following the first procedure is also indicated by both verbal representation and visual display.

7 Claims, 9 Drawing Figures

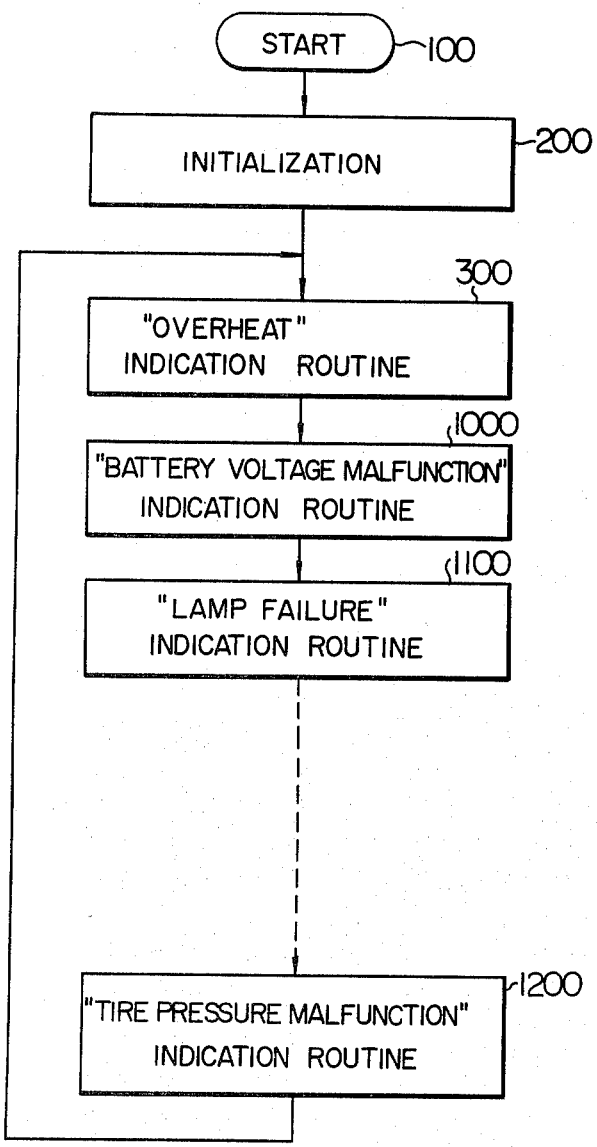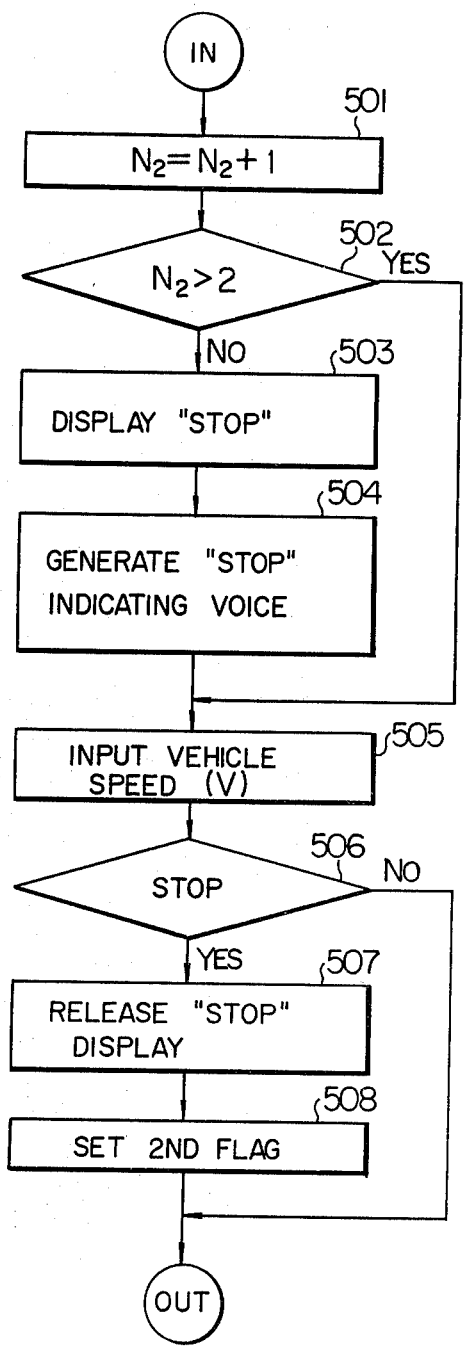

MALFUNCTION PROCEDURE INDICATING SYSTEM AND METHOD

BACKGROUND OF THE INVENTION

The present invention relates to a malfunction procedure indicating system and method designed so that when a malfunction or abnormality or irregularity is detected in any one of the items to be monitored, a plurality of malfunction procedures corresponding to the malfunction are indicated.

A warning system, called as an OK Monitor, is known in the art in which when a malfunction is detected in any unit of an automotive vehicle, one of the lamps corresponding to the faulty unit is flashed on and off to tell the driver where the malfunction or irregularity is located, and the system monitors the condition of the head-lamps, the brake lamp, the tail lamps, the washer fluid level, the battery fluid level, and the radiator fluid level, etc.

A disadvantage of this known warning system or OK Monitor is that the system is capable of simply advising the driver of the location of the detected malfunction or irregularity, thus frequently leaving the driver at a loss what to do with the malfunction.

SUMMARY OF THE INVENTION

With a view to overcoming the foregoing deficiency in the prior art, it is an object of this invention to provide a malfunction procedure indicating system so designed that the conditions of a plurality of inspection items associated with the operation or driving of a vehicle are monitored to detect the existence of a malfunction or irregularity in at least one of the plurality of inspection items whereby when the malfunction is detected, a first malfunction procedure is indicated by means of verbal representation during the operation of the vehicle and a second malfunction procedure following the first malfunction procedure is also indicated by means of verbal representation, thus, suitably sequentially indicating the malfunction procedures corresponding to a malfunction in any one of the inspection items of a vehicle.

Thus the system of this invention has among its great advantages the fact that since the conditions of a plurality of inspection items associated with the operation of a vehicle are monitored such that when a malfunction is detected in at least one of the plurality of inspection items a first malfunction procedure corresponding to the faulty inspection item is indicated by means of verbal representation during the operation of the vehicle and a second malfunction procedure following the first malfunction procedure is also indicated by means of verbal representation, the malfunction procedures corresponding to a malfunction in any one of the inspection items of a vehicle can be continuously indicated by means of verbal representation and moreover the malfunction procedures can be indicated during the operation of the vehicle, thus positively alerting the vehicle occupants to the indications.

Another great advantage is that a series of control actions relating to the operations ranging from the detection of a malfunction to the indication of a plurality of malfunction procedures can be performed automatically.

BRIEF DESCRIPTION OF THE DRAWINGS

FIG. 2 is an operational flow chart showing the overall operational processing of the microcomputer shown in FIG. 1.

FIG. 5 is an operational flow chart showing the detailed operational steps of the stop indication operational routine shown in FIG. 3.

DESCRIPTION OF THE PREFERRED EMBODIMENT

The present invention will now be described in greater detail with reference to the illustrated embodiment.

Figure 1:
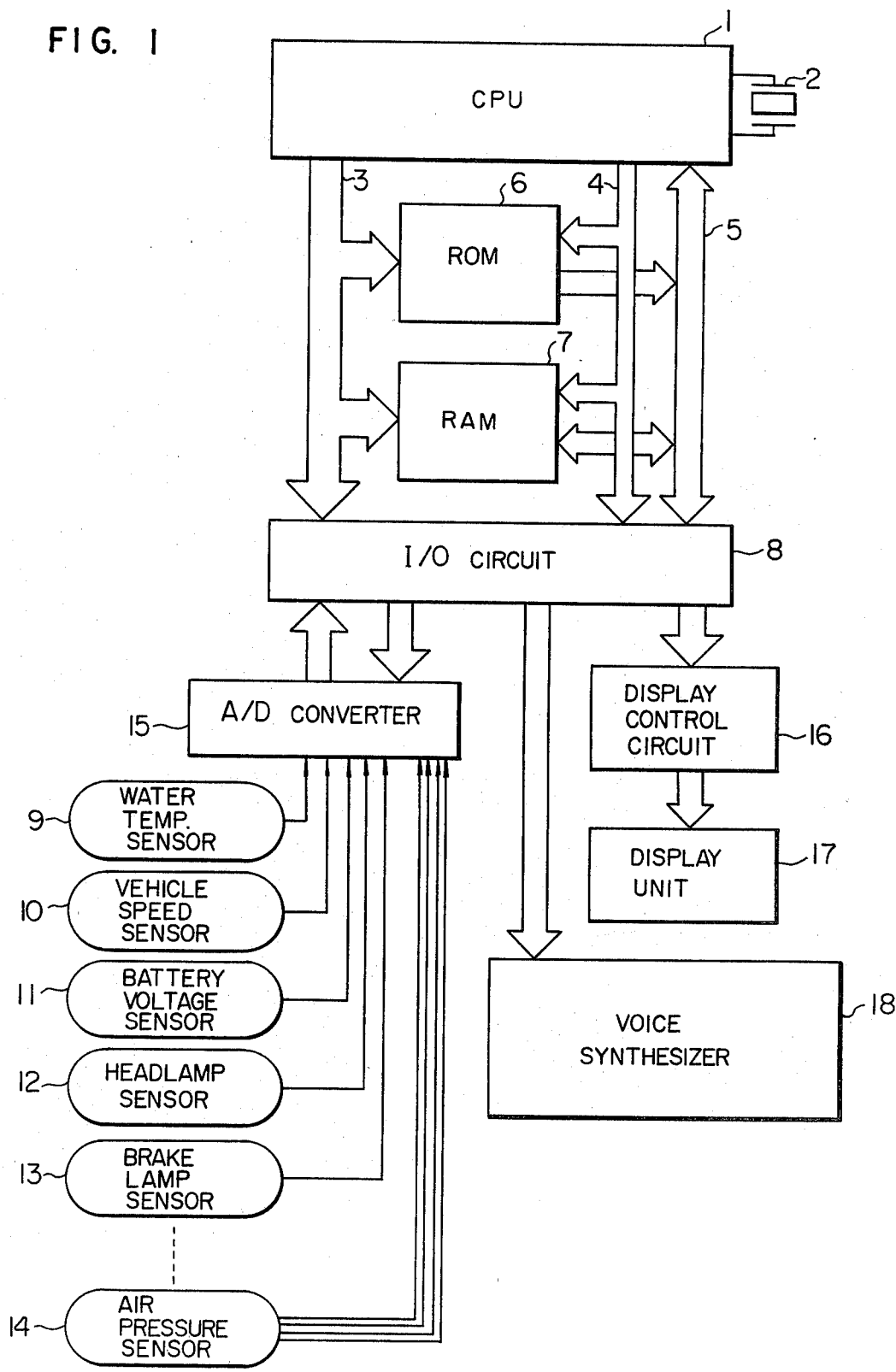
FIG. 1 is a block diagram showing the overall construction of an embodiment of the present invention.

Referring to FIG. 1, there is illustrated the overall construction of an embodiment of the invention employing a vehicle-mounted microcomputer which performs the required digital computational operations of software in accordance with a predetermined malfunction procedure indication program.

In the Figure, numeral 1 designates the central processing unit (CPU) of the vehicle-mounted microcomputer, and connected to the CPU 1 is a quartz crystal unit 2 which generates reference clock pulses of several MHz thus allowing the CPU 1 to perform the required software digital computational operations in synchronism with the reference clock pulses. The CPU 1 is connected to a read-only memory or ROM 6, a read/write memory or RAM 7 and an input/output or I/O circuit 8 which transmit and receive various data through an address bus 3, a control bus 4 and a data bus 5, thus forming a computing means. Each of these component units is comprised of a semiconductor integrated circuit. Stored in the ROM 6 are a malfunction procedure indication program comprising an operational procedure in the form of a set of sequentially recorded steps for performing the detection of malfunctions and the indication of the corresponding procedures and voice data for generating a plurality of predetermined voices corresponding to the malfunction procedures, whereby the CPU 1 successively reads out the operational procedure, performs the corresponding operations, temporarily stores the resulting intermediate data in the RAM 7 and reads out the thus stored data in case of need.

The transmission and reception of various signals between the CPU 1 and the units external to the microcomputer are controlled by the I/O circuit 8.

Numeral 9 designates a cooling water temperature sensor for sensing the engine cooling water temperature, 10 a vehicle speed sensor for sensing the speed of the vehicle, 11 a battery voltage sensor for sensing the voltage of the vehicle battery, 12 a headlamp sensor for sensing the lamp current to the headlamps, 13 a brake lamp sensor for sensing the lamp current to the brake lamp, and 14 air pressure sensors each for sensing the air pressure in one of the four tires. The sensors 9, 11, 12, 13 and 14 form a sensing means. Numeral 15 designates an A/D converter for converting an analog signal to a digital signal, that is, the analog signals from the sensors 9 to 14 are successively converted to digital signals.

Numeral 16 designates a display control circuit including a plurality of registers designed so that in response to the storage selection data contained in the indication signal from the I/O circuit 8 corresponding one of the registers stores the indication data, and the registers are successively selected to generate the stored display data signals each for a predetermined period of time. Numeral 17 designates a display unit mounted on the instrument panel and responsive to the display data signal from the display control circuit 16 to display characters in dot matrix form. Numeral 18 designates a voice synthesizer mounted in the front part of the vehicle compartment to synthesize and generate a voice in response to the voice data successively applied from the I/O circuit 8, and the voice synthesizer may for example be a digital voice synthesizer of the PARCOR type disclosed in the DENSI GIJUTSU (Electronic Techniques), Vol. 21, No. 12. The voice synthesizer 18, the display control circuit 16 and the display unit 17 form an indicating means. The component units 1 to 18 shown in FIG. 1 are operable in response to the stabilized voltage supplied from a stabilized power supply circuit (not shown) which is operable in response to the power supplied from the vehicle battery upon closing of the key switch (not shown).

With the construction described above, the operation of the embodiment will now be described with reference to the operational flow charts shown in FIGS. 2 to 9.

Figure 3:
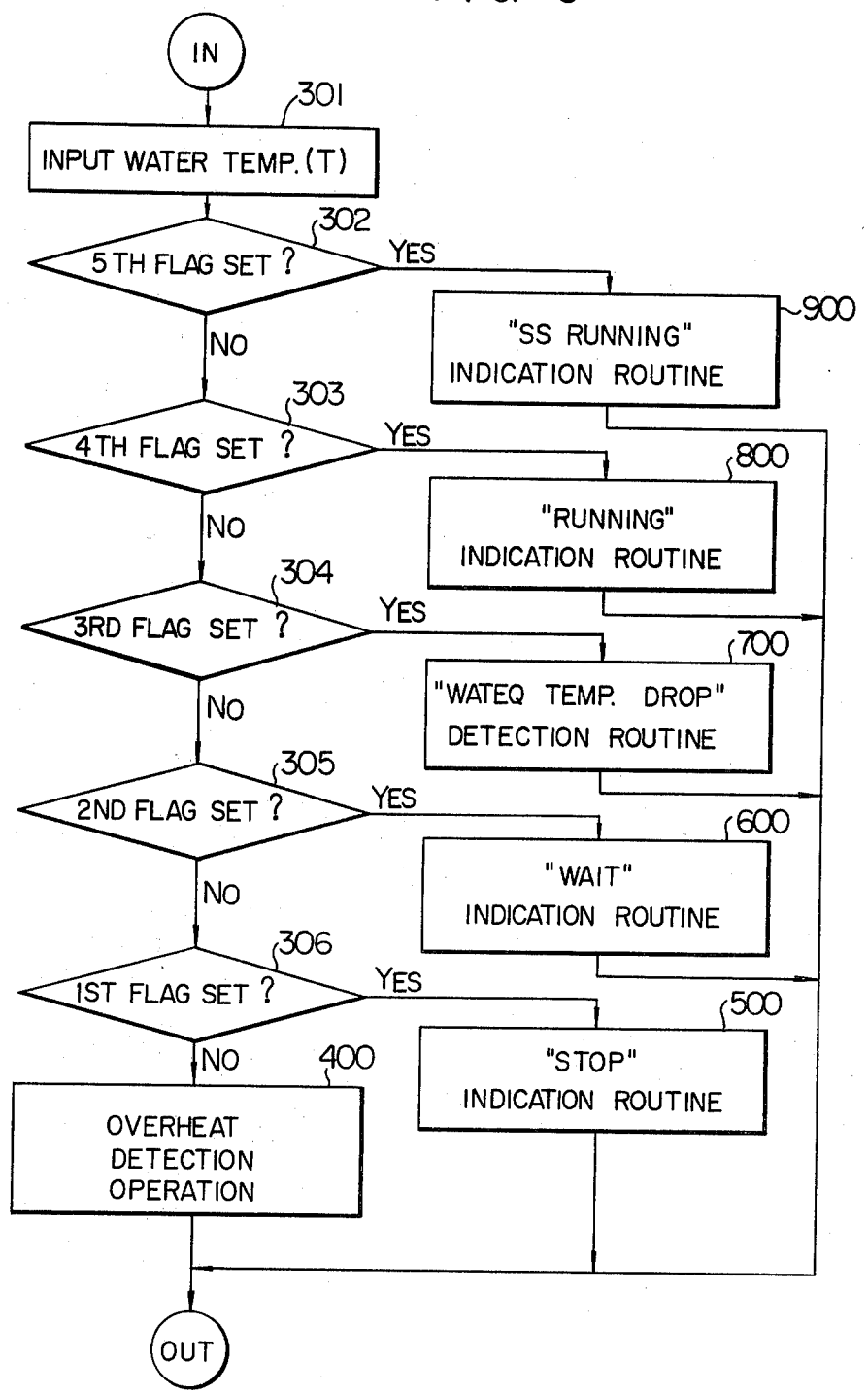
FIG. 3 is an operational flow chart showing the detailed operational steps of the overheat indication operational routine shown in FIG. 2.
Figure 4:
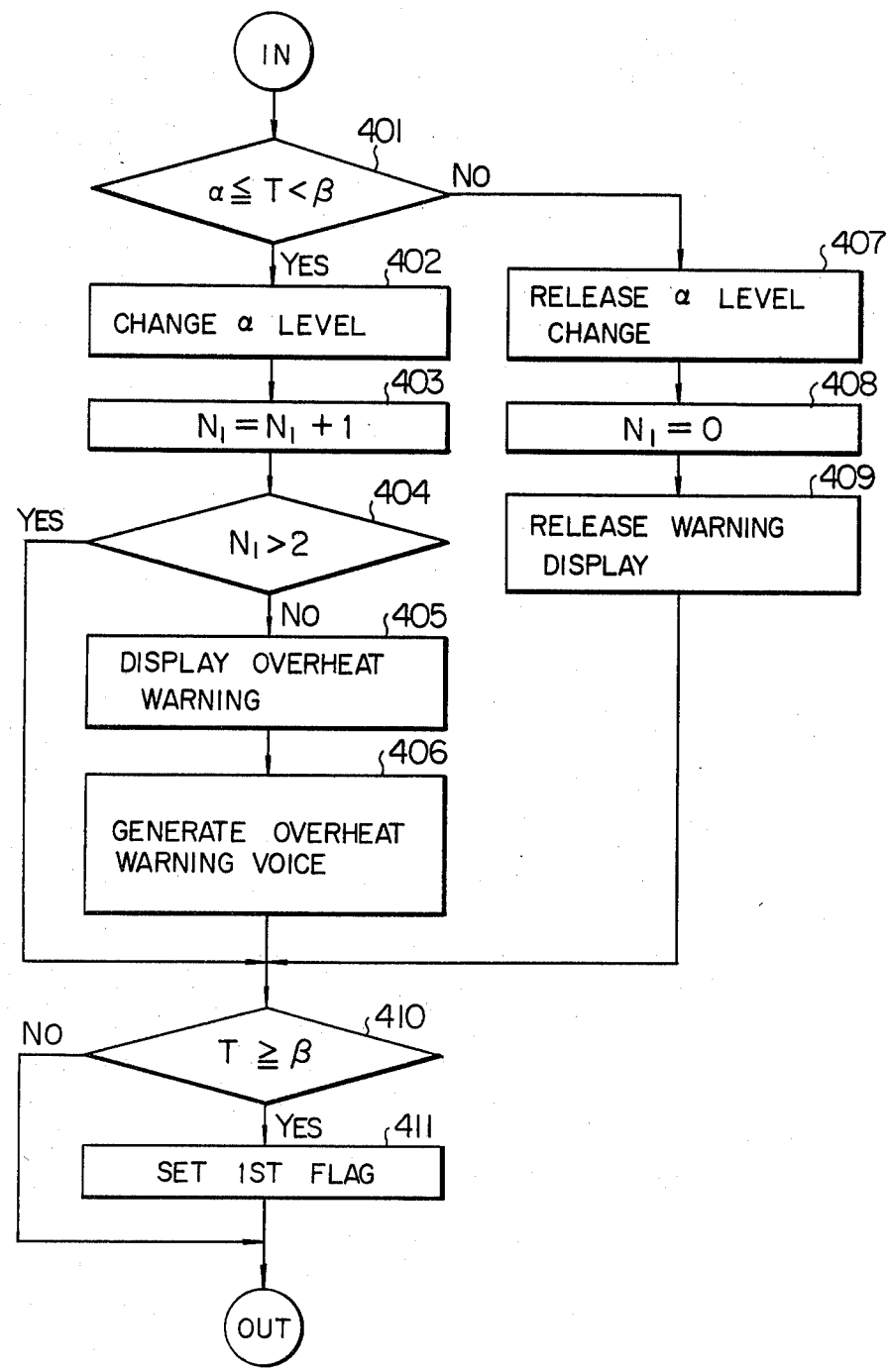
FIG. 4 is an operational flow chart showing the detailed operational steps of the overheat detecting operational routine shown in FIG. 3.
Figure 7:
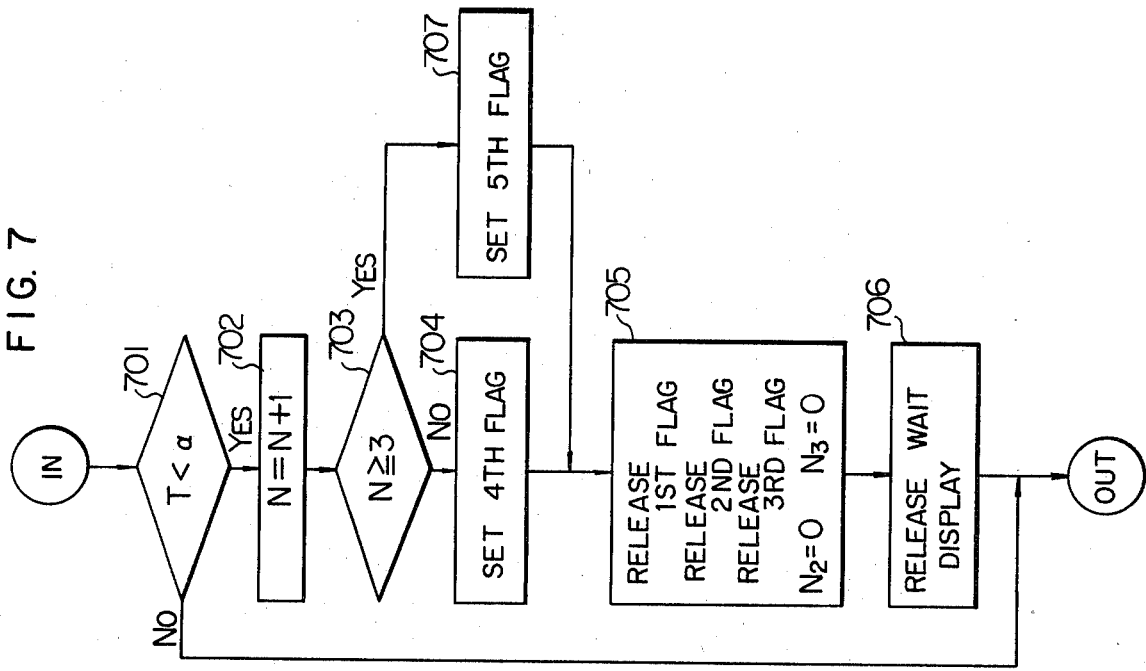
FIG. 7 is an operational flow chart showing the detailed operational steps of the water temperature drop detecting operational routine shown in FIG. 3.
Figure 6:
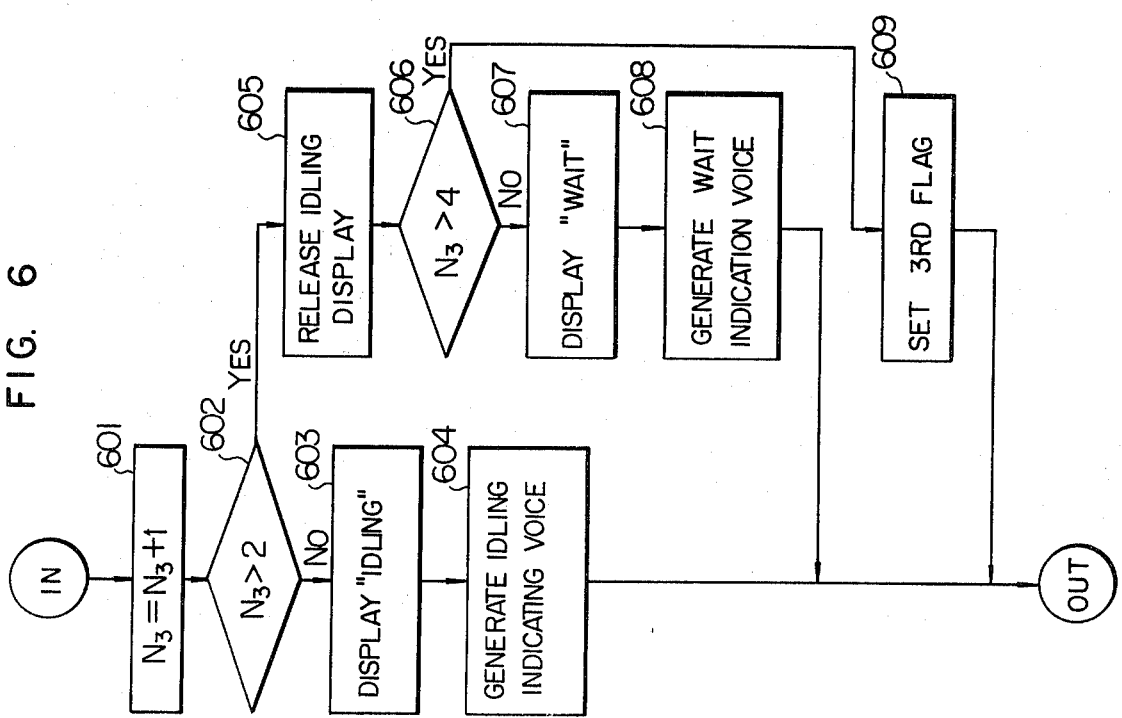
FIG. 6 is an operational flow chart showing the detailed operational steps of the wait indication operational routine shown in FIG. 3.
Figure 8:
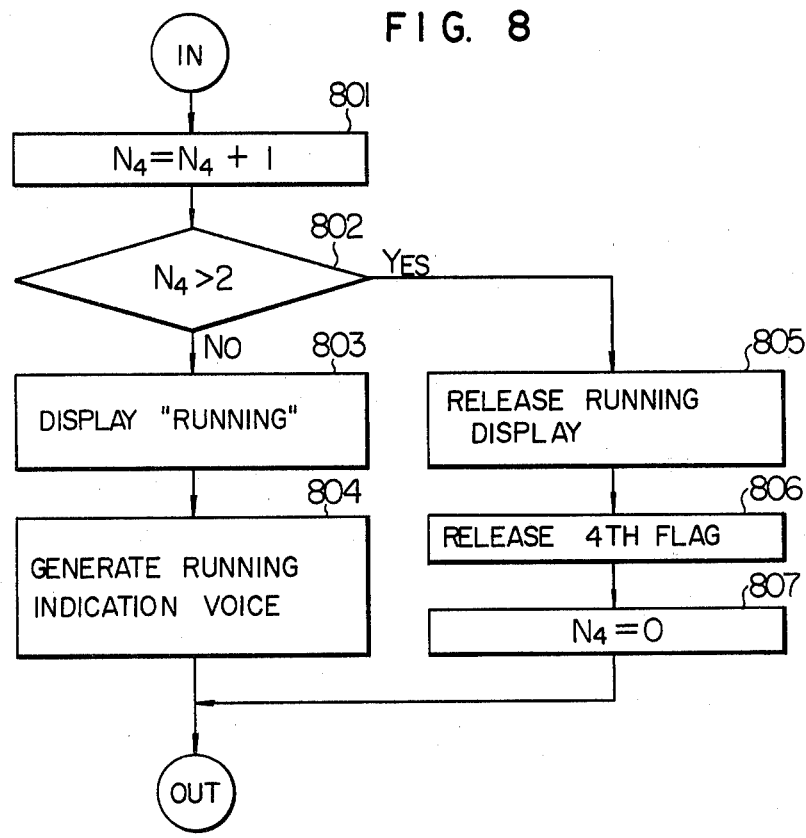
FIG. 8 is an operational flow chart showing the detailed operational steps of the running indication operational routine shown in FIG. 3.
Figure 9:
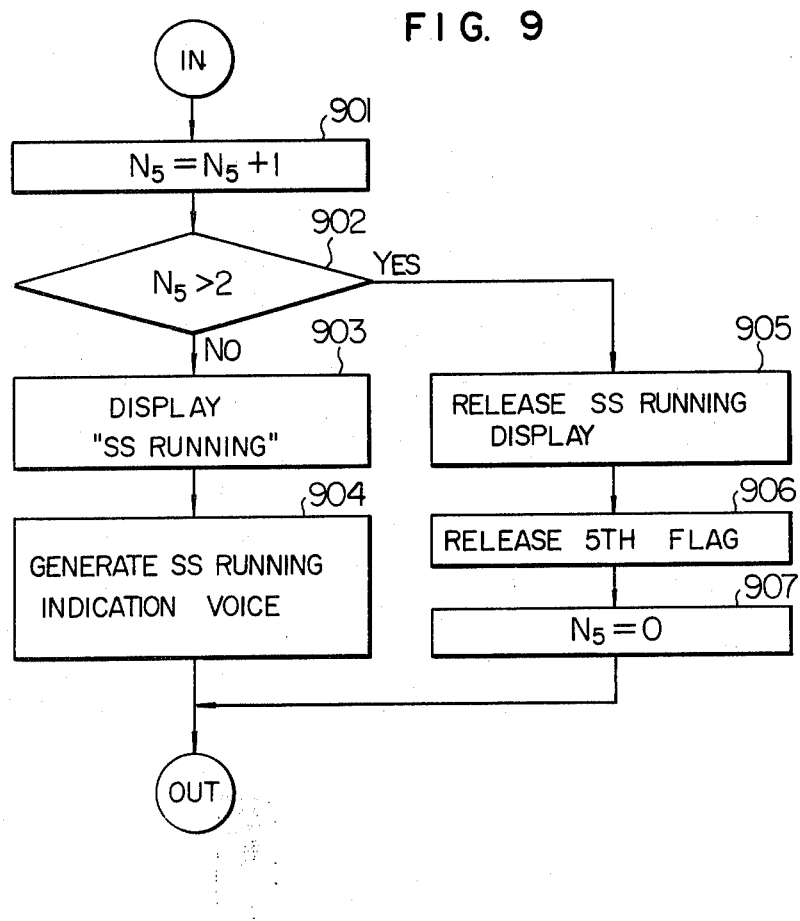
FIG. 9 is an operational flow chart showing the detailed operational steps of the standing start or SS running indication operational routine shown in FIG. 3.

FIG. 2 is an operational flow chart showing the overall operational processing of the microcomputer in accordance with the malfunction procedure indication program, FIG. 3 is an operational flow chart showing the detailed operational steps of the overheat indication operational routine of FIG. 2, FIG. 4 is an operational flow chart showing the detailed operational steps of the overheat detecting operational routine of FIG. 3, FIG. 5 is an operational flow chart showing the detailed operational steps of the stop indication operational routine of FIG. 3, FIG. 6 is an operational flow chart showing the detailed operational steps of the wait indication operational routine of FIG. 3, FIG. 7 is an operational flow chart showing the detailed operational steps of the water temperature drop detecting operational routine of FIG. 3, FIG. 8 is an operational flow chart showing the detailed operational steps of the running indication operational routine of FIG. 3, and FIG. 9 is an operational flow chart showing the detailed operational steps of the SS running indication operational routine of FIG. 3.

Now, in the vehicle equipped with the system, when the key switch is closed to start the vehicle, the stabilized voltage is supplied from the stabilized power supply circuit (not shown) to the component units 1 to 8 and these units are brought into operation. When this occurs, the operational processing of the microcomputer is started by a start step 100 of FIG. 2 and then the control is transferred to an intialization step 200 which sets the registers, counters, latches, etc., of the microcomputer to their initial states which are necessary to perform the operational processing. This initializing operation includes the initialization of a level discrimination value $\alpha$, the reset operation of first, second, third, fourth and fifth flags, the setting of frequency data $N_1$, $N_2$, $N_3$, $N_4$, $N_5$ and N to zero, etc. After the initialization step, the control is transferred to an overheat indication operational routine 300.

The overheat indication operational routine 300 performs the operational steps required for the detection of overheat in accordance with the detection signal from the cooling water temperature sensor 9 and the indication of the corresponding procedures, and then the control is transferred to a battery voltage malfunction indication operational routine 1000. The battery voltage malfunction indication operational routine 1000 performs the operational steps required for the detection of an abnormal battery voltage in accordance with the detection signal from the battery voltage sensor 11 and the indication of the corresponding procedures, and then the control is passed to a lamp failure indication operational routine 1100. The lamp failure indication operational routine 1100 is such that in response to the detection signals from the headlamp sensor 12, the brake lamp sensor 13, etc., the required operational steps are performed for the detection of a lamp falure and the indication of the corresponding procedures. After the operational routines for the indication of various other malfunction procedures have been performed, the control is transferred to a tire pressure malfunction indication operational routine 1200. The operational routine 1200 performs the operational steps for the detection of an air pressure drop or puncture in accordance with the detection signals from the air pressure sensors 14 and the indication of the corresponding procedures, and then the control is returned to the overheat indication operational routine 300. Thereafter, the operational processing of the main routine including from the overheat indication operational routine 300 to the tire pressure malfunction indication operational routine 1200 is performed repeatedly.

The detailed processing of the overheat indication operational routine 300 in the above-mentioned repeated performance of the main routine will now be described under different conditions.

The processing of the routine 300 will be described first with reference to the case where the engine cooling water temperature is not abnormally high, that is, the temperature is lower than 90° C., for example. In this case, when the control is transferred to the overheat indication operational routine 300, its operational processing is started by a water temperature input step 301 of FIG. 3. Thus, the signal from the cooling water temperature sensor 9 is introduced through the A/D converter 15 and stored as a cooling water temperature T. In this case, the value of the cooling water temperature T is lower than 90° C. Thus the control is transferred to the next fifth flag discrimination step 302 which determines whether the fifth flag has been set. Since the fifth flag has been reset by the initialization step, the determination of the step 302 results in "NO". In the like manner, the determination of each of the following fourth, third, second and first flag discrimination steps 303, 304, 305 and 306 results in "NO", and thus the control is transferred to an overheat detecting operational routine 400. The operational processing of the overheat detecting operational routine 400 is started by a warning range discrimination step 401 which determines whether the cooling water temperature T is in the range between α which is for example higher than 90° C. and β which is for example lower than 100° C. Since the cooling water temperature T is lower than 90° C., the determination resuls in "NO" and thus the control is transferred to an α level change release step 407. This release step 407 is such that if the discrimination level α has been changed to provide the determination of the warning range discrimination step 401 with hysteresis, the operation is performed to reset the discrimination level 60 to its initial level. In this case, however, the discrimination level α has not been changed and thus the current value is maintained. Then the control is transferred to the next frequency data reset step 408. The reset step 408 resets the first frequency data $N_1$ to $N_1=0$ and the control is transferred to an warning display release step 409. The release step 409 applies to the display control circuit 16 a release signal for releasing the overheat warning display. In this case, however, no display data is stored in the overheat indicating register of the display control circuit 16 and no change takes place in the display on the display unit 17. Then the control is transferred to the next overheat range discrimination step 410. The discrimination step 410 determines whether the cooling water temperature T is higher than β or 100° C. In this case, however, since the cooling water temperature T is lower than 90° C., the determination results in "NO" and one cycle of the processing of the overheat detecting operational routine 400 is completed and thus one cycle of the processing of the overheat indication operational routine 300 is also completed. Thereafter, the processing of the overheat indication operational routine 300 is repeated as the processing of the main routine is repeated and no overheat indication is made by the display unit 17 and the voice synthesizer 18.

Thereafter, if the engine cooling water temperature rises and reaches 90° C, the cooling water temperature T which is introduced and stored by the cooling water temperature input step 301 of FIG. 3 has a value higher than 90° C. As a result, when the control is transferred to the warning range discrimination step 401 of FIG. 4, its determination changes from "NO" to "YES" and the control is transferred to the next α level change step 402. The change step 402 changes the value of the discrimination level α to 85° C., for example, so as to provide a hysteresis range for the determination of the warning range discrimination step 401, and then the control is transferred to an addition step 403. While the addition step 403 adds 1 to the first frequency data $N_1$ to obtain $N_1=N_1+1$, this is the first addition and consequently the first frequency data $N_1$ is increased to 1. Then the control is transferred to the next frequency discrimination step 404 which determines whether the first frequency data $N_1$ is greater than 2 and its determination results in "NO" since the first frequency data $N_1$ is 1. Thus the control is transferred to an warning display step 405. The warning display step 405 sends to the display control circuit 16 a display signal including a data for specifying the overheat indicating register of the display control circuit 16 and a data for effecting the display of warning, and then the control is transferred to an warning indication voice generating step 406. The voice generating step 406 successively transfers the overheat warning indication voice data stored in a predetermined location of the ROM 6 to the voice synthesizer 18 at a speed of several msec. When this occurs, the display unit 17 gives an overheat warning display and the voice synthesizer 18 generates an overheat warning voice. Then the control is transferred to the next overheat range discrimination step 410 so that since the cooling water temperature T has not reached 100° C. as yet, its determination results in "NO" and one cycle of the processing of the overheat indication operational routine 300 is completed. When the control is again transferred to the overheat indication operational routine 300, the first frequency data $N_1$ increased by the addition step 403 of FIG. 4 results in 2 so that the determination of the frequency discrimination step 404 results in "NO" and the control is transferred to the warning indication voice generating step 406 by way of the warning display step 405. As a result, the voice synthesizer 18 again generates an overheat warning voice. When the control is transferred to the overheat indication operational routine 300 on and after the third cycle, the first frequency data $N_1$ increased by the addition step 403 of FIG. 4 results in 3 or over so that the determination of the frequency discrimination step 404 results in "YES" and the processing directly proceeds to the overheat discrimination step 410. As a result, the processing of the overheat indication operational routine 300 is repeated as the processing of the main routine is repeated so that after the generation of overheat warning voice has been effected twice, only the display of overheat warning is effected by the display unit 17.

Then, after the engine cooling water temperature has risen further and reached 100° C., when the control is transferred to the warning range discrimination step 401 of FIG. 4, its determination changes from "YES" to "NO" so that the control is transferred to the α level change release step 407 and the discrimination level α is restored to 90° C. Then the control is transferred to the frequency data reset step 408 so that the first frequency data $N_1$ is reset to $N_1=0$ and the control is transferred to the warning display release step 409 which in turn applies a release signal to the display control circuit 16. Then the control is transferred to the overheat range discrimination step 410. Then, the determination of the overheat range discrimination step 410 changes from "NO" to "YES" and the control is transferred to a first flag set step 411. The first flag set step 411 sets the first flag and one cycle of the processing of the overheat indication operational routine 300 is completed. As a result, the overheat warning display on the display unit 17 is extinguished.

Then, when the control is transferred again to the first flag discrimination step 306 of the overheat indication operational routine 300, since the first flag has been set, the determination of the step 306 changes from "NO" to "YES" and the control is transferred to a stop indication operational routine 500. The processing of the stop indication operational routine 500 is started by an addition step 501 of FIG. 5 and the second frequency data $N_2$ is increased by 1 ($N_2=N_2+1$). As a result, the second frequency data $N_2$ is now 1. Then the control is transferred to the next frequency discrimination step 502 which in turn determines whether the second frequency data $N_2$ is greater than 2. In this case, since the second frequency data $N_2$ is 1, the determination of the step 502 results in "NO" and the control is transferred to a stop display step 503. This stop display step 503 applies to the display control circuit 16 a display signal including a data for specifying the overheat indicating register of the display control circuit 16 and a data for effecting a stop display, and then the control is transferred to a stop indication voice generating step 504. By this voice generating step 504 the stop indicating voice data stored in a predetermined location of the ROM 6 is successively transferred at a speed of several msec to the voice synthesizer 18. As a result, the display unit 17 gives a stop display and the voice synthesizer 18 generates a stop indicating voice. Then the control is transferred to a vehicle speed input step 505 which in turn introduces the output signal of the vehicle speed sensor 10 as a vehicle speed V through the A/D converter 15, and then the control is transferred to a stop discrimination step 506. The stop discrimination step 506 determines whether the vehicle speed V has decreased to zero. In this case, since it has been just after the occurrence of the stop display, the vehicle speed is not zero and the determination of the step 506 becomes "NO" so that one cycle of the processing of the stop indication operational routine 500 is completed and thus one cycle of the processing of the overheat indication operational routine 300 is also completed. When the control is transferred again to the stop indication operational routine 500, the second frequency data $N_2$ increased by the addition step 501 becomes 2 so that the determination of the next frequency discrimination step 502 becomes "NO" and the control is transferred again to the stop indication voice generating step 504 by way of the stop display step 502. As a result, the voice synthesizer 18 again generates a stop indicating voice. When the control is transferred to the stop indicating operational routine 500 on and after the third cycle, the processing proceeding from the addition step 501 to the stop discrimination step 506 through the frequency discrimination step 502 and the vehicle speed input step 505 is performed until the vehicle is brought to a stop. As a result, the processing of the overheat indication operational routine 300 is repeated as the processing of the main routine is repeated, and after the generation of stop voice has been made two times the display unit 17 gives a stop display alone.

Then, when the vehicle is brought to a stop by the stop indication and then the control is transferred to the stop discrimination step 506, the determination of the step 506 changes from "NO" to "YES" and the control is transferred to a stop display release step 507 which in turn sends a release signal to the display control circuit 16. Then the control is transferred to a second flag set step 508 so that the second flag is set and one cycle of the processing of the overheat indication operational routine 300 is completed. As a result, the stop display on the display unit 17 is extinguished.

When the control is transferred again to the second flag discrimination step 305 of the overheat indication operational step 300, since the second flag has been set, the determination of the step 305 changes from "NO" to "YES" and the control is transferred to a wait indication operational routine 600. The processing of the wait indication operational routine 600 is started by an addition step 601 of FIG. 6 and the third frequency data $N_3$ is increased by 1 ($N_3 = N_3 + 1$). Thus, in this case the third frequency data $N_3$ becomes 1. Then the control is transferred to the next frequency discrimination step 602 which determines whether the third frequency data $N_3$ is greater than 2. In this case, since the third frequency data $N_3$ is 1, the determination of the step 602 becomes "NO" and the control is transferred to an idling display step 603. The idling display step 603 applies to the display control circuit 16 a display signal including a data for specifying the overheat indicating register of the display control circuit 16 and a data for causing the display of idling, and then the control is transferred to an idling indication voice generating step 604. Thus the step 604 transfers successively the idling indicating voice data stored in a predetermined location of the ROM 6 to the voice synthesizer 18 at a speed of several msec. As a result, the display unit 17 gives an idling display and the voice synthesizer 18 generates an idling indicating voice. This completes one cycle of the wait indication operational routine 600 and hence one cycle of the overheat indication operational routine 300. When the control is again transferred to the wait indication operational routine 600, the third frequency data $N_3$ increased by the addition step 601 becomes 2 so that the determination of the next frequency discrimination step 602 becomes "NO" and the control is again transferred to the idling indication voice generating step 603 by way of the idling display step 603. When this occurs, the voice synthesizer 18 again generates an idling indicating voice. When the control is transferred still again to the wait indication operational routine 600, the third frequency data $N_3$ is increased to 3 so that the determination of the frequency discrimination step 602 changes from "NO" to "YES" and the control is transfered to an idling display release step 695. The release step 605 sends a release signal to the display control circuit 16 to extinguish the idling display on the display unit 17, and then the control is transferred to a frequency discrimination step 606. Since the third frequency data $N_3$ is now 3, the determination of the step 606 becomes "NO" and the control is transferred to an wait display step 607. Thus the wait display step 607 sends to the display control circuit 16 a display signal including a data for specifying the overheat indicating register of the display control circuit 16 and a data for causing a wait display, and the control is transferred to a wait indication voice generating step 608. Thus the voice generating step 608 successively transfers the wait indication voice data stored in a predetermined location of the ROM 69 to the voice synthesizer 18 at a speed of several msec. As a result, the display unit 17 gives a wait display and the voice synthesizer 18 generates a wait indicating voice. Thus one cycle of the processing of the overheat indication operational routine 300 is completed, and when the control is again transferred to the wait indication operational routine 600 so that the third frequency data $N_3$ becomes 4, the determination of the frequency discrimination step 606 becomes "NO" and thus the control is transferred to the wait indication voice generating step 608 by way of the wait display step 607. As a result, the voice synthesizer 18 again generates an wait indicating voice. When the control is transferred further again to the wait indication operational routine 600, the third frequency data $N_4$ is increased to 5 so that the determination of the frequency discrimination step 606 changes from "NO" to "YES" and the control is transferred to a third flag set step 609 which in turn sets the third flag, thus completing one cycle of the processing of the overheat indication operational routine 300.

As a result, when the control is transferred again to the third flag discrimination step 304 of the overheat indication operational routine 300, its determination changes from "NO" to "YES" and the control is transferred to a water temperature drop detecting operational routine 700. The processing of the water temperature drop detecting operational routine 700 is started by a water temperature drop discrimination step 701 of FIG. 7 which determines whether the cooling water temperature T is lower than the discrimination level α or 90° C. In this case, since the cooling water temperature T still has a value higher than 100° C., the determination of the step 701 becomes "NO" and one cycle of the processing of the water temperature drop detecting operational routine 700 is completed, thus completing one cycle of the processing of the overheat indication operational routine 300. Thereafter, the processing of the overheat indication operational routine 300 is repeated as the main routine is repeated and the display unit 17 performs nly the wait display operation.

During the wait period under idling condition, the engine cooling water temperature gradually drops and eventually becomes lower than 90° C. Thus, when the control is transferred to the water temperature drop discrimination step 701 of FIG. 7, its determination changes from "NO" to "YES" and the control is transferred to an addition step 702 which in turn increases the frequency data N by 1 (N=N+1). As a result, the frequency data N now becomes 1. Then the control is transferred to the next frequency discrimination step 703 which determines whether the frequency data N is greater than 3. In this case, since the frequency data N is 1, the determination of the step 703 becomes "NO" and the control is transferred to a fourth flat set step 704 which in turn sets the fourth flag. Then the control is transferred to an all setting step 705. The all setting step 705 performs the releasing of the first, second and third flags and the setting of second and third frequency data $N_2$ and $N_3$ to $N_2=0$ and $N_3=0$, and then the control is transferred to an wait display release step 706 which in turn sends a release signal to the display control circuit 16 to extinguish the wait display on the display unit 17. This completes one cycle of the processing of the overheat indication operational step 300.

As a result, when the control is again transferred to the fourth flag discrimination step 303 of the overheat indication operational routine 300, its determination changes from "NO" to "YES" and the control is transferred to a running indication operational routine 800. The processing of the running indication operational routine 800 is started by an addition step 801 of FIG. 8 and the fourth frequency data $N_4$ is increased by 1 ($N_4=N_4+1$). As a result, the fourth frequency data $N_4$ now becomes 1. Then the control is transferred to an running display step 803. The running display step 803 sends to the display control circuit 16 a display signal including a data for specifying the overheat indicating register of the display control circuit 16 and a data for causing a running display, and then the control is transferred to a running indication voice generating step 804. The voice generating step 804 successively transfers the running indication voice data stored in a predetermined location of the ROM 6 to the voice synthesizer 18 at a speed of several msec. As a result, the display unit 17 gives a running display and the voice synthesizer 18 generates a running indicating voice. This completes one cycle of the processing of the running indication operational routine 800 and hence one cycle of the processing of the overheat indication operational routine 300. When the control is again transferred to the running indication operational routine 800, the fourth frequency data $N_4$ is increased to 2 so that the determination of the next frequency discrimination step 802 becomes "NO" and the control is transferred to the running indication voice generating step 804 by way of the running display step 803. As a result, the voice synthesizer 18 generates an running indicating voice. Then, when the control is transferred again to the running indication operational routine 800, the fourth frequency data $N_4$ is increased to 3 so that the determination of the next frequency discrimination step 802 changes from "NO" to "YES" and the control is transferred to a running display release step 805 which in turn sends a release signal to the display control circuit 16 to extinguish the running display on the display unit 17. Then the control is transferred to a fourth flag release step 806 and the fourth flag is released. Then the control is transferred to a frequency data reset step 807 so that the fourth frequency data $N_4$ is reset to $N_4=0$ and one cycle of the processing of the overheat indication operational routine 300 is completed.

As a result, when the control is transferred again to the overheat indication operational routine 300, the processing proceeding from the water temperature input step 301 of FIG. 3 to the overheat detecting operational routine 400 by way of the fifth flag discrimination step 302, the fourth flag discrimination step 303, the third flag discrimination step 304, the second flag discrimination step 305 and the first flag discrimination step 306 is performed. As a result, after an running admission indication has been given to the driver, the overheat detection is started once again from the beginning.

Thereafter, the same overheat detection is performed three times so that when the frequency data N increased by the addition step 702 of FIG. 7 becomes 3, the determination of the next frequency discrimination step 703 becomes "YES" so that the control is transferred to a fifth flag set step 707 which sets the fifth flag, thus completing one cycle of the overheat indication operational routine 300 by way of the all setting step 705 and the wait display release step 706. As a result, when the control is again transferred to the fifth flag discrimination step 302 of the overheat indication operational routine 300, the determination of the step 302 changes from "NO" to "YES" and the control is transferred to an SS runnng indication operational routine 900. The processing of the SS running indication operational routine 900 is started by an addition step 901 of FIG. 9 and the fifth frequency data $N_5$ is increased by 1 ($N_5 N_5+1$). As a result, the fifth frequency data $N_5$ now becomes 1. The control is transferred to the next frequency discrimination step 902 so that since the fifth frequency data $N_5$ is 1, the determination of the step 902 becomes "NO" and the control is transferred to an SS running display step 903. The display step 903 sends to the display control circuit 16 a display signal including a data for specifying the overheat indicating register of the display control circuit 16 and a data for causing a SS running display, and then the control is transferred to a SS running indication voice generating step 904. Thus the voice generating step 904 successively sends the SS running indication voice data stored in a predetermined location of the ROM 6 to the voice synthesizer 18 at a speed of several msec. As a result, the display unit 17 gives a SS running display, and the voice synthesizer 18 generates a SS running indication voice. This completes one cycle of the processing of the SS running indication operational routine 900 and thus one cycle of the processing of the overheat indication operational routine 300 is completed. When the control is again transferred to the SS running indication operational routine 900, the fifth frequency data $N_5$ is increased to 2 and the determination of the next frequency discrimination step 902 becomes "NO", thus transferring the control to the SS running indication voice generating step 904 by way of the SS running display step 903. As a result, the voice synthesizer 18 again generates a SS running indication voice. When the control is transferred further again to the SS running indication operational routine 900, the fifth frequency data $N_5$ is increased to 3 so that the determination of the next frequency discrimination step 902 changes from "NO" to "YES" and the control is transferred to a SS running display release step 905 which in turn sends a release signal to the display control circuit 16 to extinguish the SS running display. Then the control is transferred to a fifth flag release step 906 to release the fifth flag and then the control is passed to a frequency data reset step 907 to reset the fifth frequency data $N_5$ to $N_5=0$, thus completing one cycle of the processing of the overheat indication operational routine.

As a result, when the control is again transferred to the overheat indication operational routine 300, the processing proceeding from the water temperature input step 301 of FIG. 3 to the overheat detecting operational routine 400 by way of the fifth, fourth, third, second and first flag discrimination steps 302, 303, 304, 305 and 306 is performed. As a result, after a SS running indication has been given to the driver, the overheat detection is started all over again.

While, in the embodiment described above, a plurality of procedures are indicated only by means of the display of the display unit 17 and the voice generation of the voice synthesizer 18, it is possible to use only one or the other of them or it is possible to use the display unit 17 in combination with a buzzer which produces a buzzing sound in synchronism with the display of the display unit 17. Further, while the voice synethesizer 18 generates a voice twice for every indication, it is possible to provide a recognition switch so that a voice is generated continuously until the switched is closed or alternately a voice may be generated continuously until a step denoting voice of the driver is recognized. Still further, it is possible to arrange so that the generation of a voice is stopped when either the combination of the closing of the recognition switch and the recognition of a stop voice or the above-mentioned number of repetitions takes place.

Still further, it is possible to arrange so that when a malfunction is detected, the malfunction is informed to specify a tape having recorded therein a predetermined procedure corresponding to the malfunction and thereby to successively reproduce the contents of the tape and indicate the malfunction procedure. The reproduction of tape contents may be performed after the vehicle has been brought to a stop.

Still further, while the computing means comprises a microcomputer which comes into operation upon start of a vehicle, it may be replaced with a hardware logic arrangement employing electronic circuitry. Further, where the computing means is operated at all times irrespective of the operation of a vehicle, the detecting means or the indicating means may be designed to perform a function of indicating a malfunction procedure during the operation of the vehicle.

Still further, the indication of a plurality of malfunction procedures may be effected simultaneously by means of the display of a cathode ray tube or the like.

We claim:

1. A malfunction procedure indicating system comprising:
   sensing means for sensing a condition of each of a plurality of inspection items associated with an operation of a vehicle to generate a detection signal;
   computing means responsive to the detection signals of said sensing means such that when the existence of a malfunction in at least one of said plurality of inspection items is determined, a first indication signal corresponding to said malfunction inspection item is generated, and said computing means monitors whether an operation as indicated by the first indication signal has been carried out, a second indication signal is generated upon detecting that the operation is carried out, and thereafter said computing means generates an indication discontinuing signal when it is determined from the signal of said sensing means that the malfunction does not exist;
   indicating means responsive to said first and second indication signals from said computing means to indicate a malfunction procedure from said computing means to indicate a malfunction procedure by verbal representation in response to each of said indication signals during the operation of said vehicle, said indicating means discontinuing indication in response to said indication discontinuing signal.

2. A malfunction procedure indicating system comprising:
   sensing means for sensing a condition of each of a plurality of inspection items associated with an operation of a vehicle to generate a detection signal;
   computing means responsive to the detection signals of said sensing means such that when the existence of a malfunction in at least one of said plurality of inspection items is determined, a first indication signal corresponding to said malfunctioning inspection item and a second indication signal different from said first indication signal are generated;
   indicating means responsive to said first and second indication signals from said computing means to indicate a malfunction procedure by verbal representation in response to each of said indication signals during the operation of said vehicle; and
   wherein said sensing means includes a cooling water temperature sensor, battery voltage sensor, a headlamp sensor, a brake lamp sensor and air pressure sensors.

3. A system according to claim 2, wherein said indicating means is responsive to the indication signals from said computing means to indicate the malfunction procedures by both verbal representation and visual display.

4. A malfunction procedure indicating system comprising;
   a plurality of sensors each for sensing a condition of one of a plurality of inspection items associated with an operation of a vehicle to generate a detection signal;
   an analog-to-digital converter for converting analog detection signals generated from each of said said sensors to digital signals;
   computing means including a central processing unit, and a read-only memory and a read/write memory which are connected to said central processing unit, for reading in the digital signals from said analog-to-digital converter and checking the condition of each of said plurality of inspection items by programmed processing, whereby when the existence of a malfunction in at least one of said plurality of inspection items is determined, a first indication signal corresponding to said malfunctioning inspection item and a second indication signal different from said first indication signal are generated;

a voice synthesizer responsive to said indication signals from said computing means to synthesize a voice and indicate a malfunction procedure corresponding to each of said indication signals by verbal representation; and a display unit responsive to said indication signals from said computing means to indicate said malfunction procedure corresponding to each of said indication signals by visual display.

5. A system according to claim 4, wherein said plurality of sensors include a cooling water temperature sensor, a battery voltage sensor, a headlamp sensor, a brake lamp sensor and air pressure sensors.

6. A malfunction procedure indicating method comprising the steps of:

monitoring an engine cooling water temperature of a vehicle;

detecting whether the engine cooling water temperature has exceedd a first predetermined value;

indicating by verbal indication a warning of engine overheat on the basis of said detection;

detecting whether the engine cooling water temperature has exceeded a second predetermined value;

generating a voice indicating a first matter which the driver of the vehicle should operate, on the basis of said latter detection that whether the engine cooling water temperature has exceeded the second predetermined value; and monitoring whether an operation of the first matter has been carried out, and generating, when the operation has been carried out, a voice indicating a second matter which the driver of a vehicle should operate.

7. A malfunction procedure indicating method according to claim 6, further comprising the steps of:

detecting whether the engine cooling water temperature has become lower than said first predetermined value; and indicating by voice a matter that the driver may run the vehicle.

* * * * *